Patented Apr. 25, 1939

2,156,220

UNITED STATES PATENT OFFICE 2,156,220

CHEMICAL PLUGGING OF STRATA

Thomas H. Dunn, Tulsa, Okla., assignor to Stanolind Oil and Gas Company, Tulsa, Okla., a corporation of Delaware No Drawing. Application June 30, 1937, Serial No. 151,176

4 Claims. (Cl. 166—21)

This invention relates to a new method suitable for plugging strata in wells. The method has been tested and the results obtained show it to be applicatory to shutting off water flow in wells, particularly oil wells. The term "water" as used herein is intended to include brines.

My invention comprises a method of effectively closing pores and voids in water-bearing formations through which an oil well passses, wherein an aqueous solution of a magnesium salt is injected into the water-bearing strata followed by a solution of an alkali hydroxide, whereupon a reaction occurs in which a copious, voluminous, gelatinous precipitate, consisting largely of magnesium hydroxide ($Mg(OH)_2$) is formed in the pores of the formation, effectively sealing them to the passage of water.

Inflows of underground water to oil wells must frequently be shut off, and this problem is of great importance. The water-bearing sands are often closely adjacent to oil producing sands. The inflow of water is objectionable because of increased corrosion of well equipment, increased pumping expenses, and often the formation of stable emulsions of oil and water. Moreover, the use of steel casings to case off the water-bearing zone is not applicable in the case of closely alternating oil and water strata.

It is an object of my invention to provide an inexpensive, highly efficient method of plugging the pores of porous formations encountered in oil well drilling and production thereby shutting off unwanted fluid flow, particularly from formations containing water.

In plugging a water-bearing stratum according to the present invention there is first injected into the stratum, under pressure, an aqueous solution of a water soluble magnesium salt such as magnesium chloride, followed directly by an aqueous solution of an alkali hydroxide, preferably a solution of sodium hydroxide, which causes a voluminous gelatinous precipitate of magnesium hydroxide to be formed in the pores of the water-bearing formation. This precipitate seals the pores of the formation and renders it impermeable to water.

It is important that the magnesium chloride be used prior to the hydroxide because the interconnecting voids or pores are, in this manner, filled with a concentrated solution of magnesium chloride which subsequently reacts with the hydroxide to form a precipitate suitable for effective plugging. With the other sequence of introducing the chemicals, more or less precipitate is formed as a result of the hydroxide reacting with the magnesium salts in the formational water, or brine, and the precipitate obtained is not as voluminous nor as suitable for plugging as that formed in accordance with my invention. The precipitate formed by the hydroxide and brine may also seal off many channels filled with water, preventing entrance of hydroxide into these channels, consequently reducing the proportion of the pores plugged with precipitates compared to the sequence wherein magnesium chloride is introduced first.

The details of a typical experiment performed to test the effectiveness of this invention are as follows: A core section of East Texas Field Woodbine consolidated sand, 1.25 inches in length, and .75 inch in diameter, was placed in a holder of such design that practically no dead end space existed with the core in place in the holder. The permeability of the core to a filtered oil field brine was carefully determined; permeability being a measure of the ability of a porous medium, in this case porous sandstone, to transmit a fluid such as water. Thus, the higher the permeability of a sandstone, or other porous body, the lower is the resistance which it offers to the flow of a fluid through it; and conversely, the lower the permeability of a porous body, the higher is the resistance which it offers to the flow of a fluid through it.

A solution of magnesium chloride, made up in the proportion of 20 parts by weight of magnesium chloride to 100 parts by weight of water, was forced into the core, entering at the top. On the appearance of the magnesium chloride solution passing through the core, the passage of magnesium chloride solution was discontinued, and all magnesium chloride solution remaining above the core was removed. A strong solution of sodium hydroxide (50 parts by weight of sodium hydroxide to 100 parts by weight of water) was next forced into the core, entering from the top, until the appearance of the first sodium hydroxide solution passing through the core, upon which the cell was shut in and allowed to stand for 45 minutes. Filtered brine water of the same kind as was used for initially measuring the permeability of the core was then forced into the core from the bottom, this direction of flow being the same as that in the initial permeability determination. The brine was forced through the core and the permeability was noted periodically, until no further change in permeability occurred. It was found in this case that the permeability of the core to brine had decreased 98.8%, as compared to the permeability of the core before the treatment with the solutions of magnesium chloride and caustic soda; that is, the ability of the core to transmit brine after treatment was only 1.2% as great as it was initially.

In this experiment, the length of core used was relatively small compared to the depth of formation penetrated horizontally in a wall, in which case the two solutions penetrate much farther into the formation. This not only gives a longer plugged section, but the farther back in the formation the plugging material is located, the less is the pressure differential.

To check further the efficiency of this plugging method, the same experiment was repeated under identical conditions, using the most effective chemical plugging agents heretofore employed in place of the magnesium chloride and sodium hydroxide solutions. It was found that the plugging efficiency of the magnesium chloride and sodium hydroxide solutions was extremely good compared with results obtained with the best chemical plugging agents heretofore used in the art.

This method of treating is not restricted to the use of magnesium chloride and caustic soda. Other water soluble magnesium salts such as magnesium nitrate and magnesium bromide can be used in place of magnesium chloride, and other alkali hydroxides, for instance potassium hydroxide, can be used in place of sodium hydroxide. Ammonium hydroxide can also be used and is to be considered to fall within the term "alkali hydroxide" as used in the claims. Calcium hydroxide can likewise be used although it is not preferred. The strengths of the two solutions can be varied also, over a wide range, and are not restricted to the quantities used in the experiment previously described. I prefer, however, to use magnesium salt concentrations of about 3-50% and alkali hydroxide concentrations of about 10-60%.

The manner of applying the treatment to an oil well depends upon the particular conditions of the well, but comprises introducing the two solutions in the order given in the experiment into the water-bearing stratum or strata under a pressure greater than the normal well pressure and sufficient to overcome the hydrostatic pressure in the water-bearing formation, the solutions being introduced in amounts sufficient to enter the pores, pass outward from the well a considerable distance and react with each other to form a copious, voluminous precipitate of magnesium hydroxide. After introduction of the solution, the pressure should be maintained for a period of at least ten minutes and preferably at least a half hour to allow time for the solutions to react completely and for the precipitate formed to coagulate.

Water-bearing strata can be plugged without plugging oil-bearing strata by various methods, for instance by plugging off water-bearing strata encountered in conjunction with oil-bearing strata by the use of packers and by other methods known to the art.

In case an oil-bearing stratum is accidentally or otherwise sealed off, it may be opened up again by injecting an acid solution which removes the deposited material.

I claim:

1. The method of shutting off unwanted fluid flow from a stratum encountered in a well which comprises introducing an aqueous solution of a magnesium salt into said stratum under pressure in excess of the normal well pressure and sufficient to overcome the hydrostatic pressure in said stratum, then introducing a solution of an hydroxide selected from the group consisting of sodium, potassium, ammonium and calcium hydroxides into said stratum, discontinuing the introduction of said hydroxide solution, and then continuing the application of pressure to maintain said two solutions in place for a substantial period of time to cause said two solutions to react with each other and form a copious, voluminous, gelatinous precipitate of magnesium hydroxide within the pores of said stratum thereby shutting off fluid flow therefrom.

2. The method of plugging a water-bearing formation in an oil well penetrating oil- and water-bearing formations, which comprises forcing an aqueous solution of a water soluble magnesium salt into the water-bearing formation under pressure, the pressure being sufficient to overcome the hydrostatic pressure in the water-bearing formation, then forcing an aqueous solution of an alkali hydroxide into the water-bearing formation to react therein with the magnesium salt, discontinuing the introduction of hydroxide solution, and continuing the application of the pressure for a period of time after discontinuing introduction of the solutions to allow the solutions to react with each other and form a copious, voluminous, gelatinous precipitate of magnesium hydroxide which shuts off the inflow of water into the well.

3. The method of plugging a water-bearing formation encountered in an oil well, which comprises forcing an aqueous solution of a magnesium salt into the water-bearing formation under pressure, the pressure being sufficient to overcome the hydrostatic pressure in the water-bearing formation, then forcing an aqueous solution of an alkali hydroxide into the water-bearing formation to react therein with the magnesium salt, the two solutions being introduced in concentrations and amounts to give a copious, voluminous, gelatinous precipitate of magnesium hydroxide, discontinuing the introduction of hydroxide solution, and continuing the application of the pressure for a period of time after discontinuing introduction of the solutions to cause the two solutions to react with each other and to cause the precipitate to coagulate in the pores of the formation thereby shutting off the flow of water into the well.

4. The method of plugging a water-bearing formation in an oil well penetrating oil and water-bearing formations, which comprises forcing an aqueous solution of magnesium chloride into the water-bearing formations under pressure, the pressure being sufficient to overcome the hydrostatic pressure in the water-bearing formation, then forcing an aqueous solution of sodium hydroxide into the water-bearing formation to react therein with the magnesium chloride, the two solutions being introduced in concentrations and amounts to give a copious, voluminous, gelatinous precipitate of magnesium hydroxide, discontinuing the introduction of sodium hydroxide solution, and continuing the application of the pressure for a period of time after discontinuing introduction of the solutions to cause the two solutions to react with each other and to cause the precipitate to coagulate in the pores of the formation thereby shutting off the flow of water into the well.

THOMAS H. DUNN.